United States Patent [19]

Parsons et al.

[11] Patent Number: 5,029,290
[45] Date of Patent: Jul. 2, 1991

[54] EMERGENCY ALERT SYSTEM

[75] Inventors: Donald F. Parsons, West Chester; Brian D. Greenwald, Chester Springs; John J. McGrath, Kennett Square; Michael Dudek, Philadelphia; Leo D. Parsons, Chester Springs, all of Pa.

[73] Assignee: Communications Test Design, Inc., West Chester, Pa.

[21] Appl. No.: 473,446

[22] Filed: Feb. 2, 1990

[51] Int. Cl.⁵ .............................................. G08B 1/08
[52] U.S. Cl. .................................. 340/533; 340/531; 340/512; 340/513; 340/538; 379/48; 379/49; 379/39; 379/42
[58] Field of Search .............. 340/533, 531, 512, 513, 340/538; 379/39, 42, 43, 44, 48, 49

[56] References Cited

U.S. PATENT DOCUMENTS 3,697,984 10/1972 Atkinson et al. .................... 340/512
3,707,708 12/1972 Dan ...................................... 379/44
3,748,389 7/1973 Casterline et al. ................... 379/39
4,060,803 11/1977 Ashworth, Jr. ..................... 340/506

Primary Examiner—Donnie L. Crosland
Attorney, Agent, or Firm—Ratner & Prestia

[57] ABSTRACT

An alarm system suitable for use in a telecommunications network in which a central switching system is capable of selectively providing a signal of a predetermined polarity to a plurality of remotely located stations without being dependent upon or impeding the ability of the central switching system to process relatively high volume communications traffic. Each of the remote stations is connected to the telecommunications network by an electrical conduction path. The stations are substantially unresponsive to the predetermined polarity signal. In response to an alarm indication signal, the system effects a reversal in the polarity of the signal provided to a selected subset of the remote stations. Each station in the selected subset responds to the polarity reversal by indicating an alarm condition.

7 Claims, 4 Drawing Sheets

EMERGENCY ALERT SYSTEM

BACKGROUND OF THE INVENTION

1. Field of the Invention

The present invention relates generally to community alarm systems and more particularly to the use of DC voltage polarity reversal in subscriber telephone circuits from a central office distribution frame to activate alarms at distributed subscriber locations.

2. Description of the Prior Art

Emergency alert systems have been devised to warn citizens of dangerous conditions which may exist due to chemical or nuclear plant accidents, fires, floods or other disaster. Use of existing telephone networks for these alarm systems allows the warning authority to reach a large cross section of the affected population. Current warning systems utilize the Central Office Switch to dialup each customer to be warned. Telephone networks provide effective and cost efficient media for the transfer of signals which may be used to activate an alarm at the subscribers location.

DC control signals have been used for many years as an integral component of telephone systems. These DC signals include the presence or absence of circuit current or voltage, or of a specific voltage polarity. DC signals have been used to indicate on-hook and off-hook conditions at subscriber locations, dial pulses, or connection status as a call is initiated. For example, the circuit between a telephone handset and the central office servicing the telephone is typically open when the handset is in its on-hook position. Continuous current flows through a closed circuit when the handset is in an off-hook position. Current flow interrupted at a specified rate is interpreted as pulse dialing. DC signals are advantageous due to their simplicity. Since they either involve on/off or positive/negative choices, these signals are easily recognized by inexpensive means. Tone signalling methods are also common for status and control. The dial tone and the busy signal provide the caller with information about the status of the call being initiated. Dual Tone Multifrequency (DTMF) telephones use unique combinations of tones to send control information from a push-button telephone to the central office, typically to define the phone number which is being called. DC and tone signalling have been combined to provide extensive phone services.

Alarm systems have used DC and tone signals to receive information from subscribers, as in a burglar alarm system. U.S. Pat. No. 3,757,323 to Pintell relates to a monitoring system for which a reversible DC voltage is impressed upon the conductors of a two wire line at each of the subscriber locations. The occurrence of an event or condition which is being monitored (e.g. an indication of forced entry) causes a reversal of the polarity at the subscriber location. This DC signal is transmitted from the subscriber to a central monitoring station and is detected by a coupler at the central station. U.S. Pat. No. 3,027,424 to Breed also relates to a system involving polarity reversal to achieve different desired results. In Breed, polarity switching is used to determine whether to collect or refund coins from a pay phone. In Breed, however, the activation of a relay to collect a coin is initiated by establishing a positive circuit polarity at the pay phone in response to the depositing of a coin. The reversal of the circuit polarity to negative in order to refund a coin is initiated at the central office.

Alarm systems in which a signal is broadcast from a single location to multiple subscribers are also known. U.S. Pat. No. 3,643,029 to Breazeale teaches a subscriber receiver unit having a frequency detector for sensing the simultaneous transmission of two specific frequencies by transmitter 10 from the central office. The receiver unit is connected to the existing Tip and Ring pair which joins the subscriber telephone to the central office. The receiver unit is installed in parallel with the subscriber telephone.

The Breazeale system requires special equipment in the central office which effectively dials up each subscriber to be warned of the emergency. The use of a tone signal requires audio generators 14, 30 filter 12, and a frequency detector at each subscriber site, increasing the total hardware costs for implementing this system. In addition, this system ties up a portion of the central office switch during the emergency situation, at a time when there is likely to be an increased demand for telephone service.

SUMMARY OF THE INVENTION

Previously, alarm systems capable of broadcasting warnings to an entire subscriber population required modifications to the Central Office Switch (COS). The COS is the telephone switching machine which uses electronics, electromechanical crosspoints, programmed digital switching networks, and/or a human operator to connect one subscriber with another. It is desirable for alarm systems to leave the COS unaffected, since the COS is likely to be fully occupied with critical communications during an alarm situation. Moreover, the various interface requirements of the many different types of COS may increase the complexity and thus the cost of the alarm system. In addition, retrofitting such a system into an existing COS may cause disruption of subscriber service.

The present invention is embodied in an emergency alert system (EAS) having a set of switching blocks which provide a break point between the COS and the subscribers. Enabling a switching block allows the normal path to between the subscriber and the COS to be opened. Paths from the Emergency Alert System directly to the subscribers are established to activate the respective subscriber alarm units. This activation is accomplished by reversing the polarity of the Tip-Ring line pair for each subscriber connected to the switching blocks so enabled.

According to a particular aspect of the invention, the alarm system is implemented in equipment in the central office outside of the central office switch. Thus this alarm system may be used with many different types of COS.

According to another aspect of the invention, each switching block may be assigned one of a set of 'zones.' The system provides a means for the person initiating the alert to select which of these zones are to be notified of emergency. A means is provided for enabling only those switching blocks assigned to the selected zones when activating the alarm.

According to yet another aspect of the invention, the Emergency Alert System activates the subscriber alarms in the affected zones without involving the central office COS. Alarms are automatically sounded for each subscriber in the affected zones regardless of whether the subscriber's phone is off-hook or busy prior to alarm activation. Service is not affected for subscribers who are not in the alarm system or who are not in the selected zones.

DETAILED DESCRIPTION OF THE PREFERRED EMBODIMENT

The following is a description of an exemplary Emergency Alert System (EAS) in accordance with the present invention.

Figure 1:
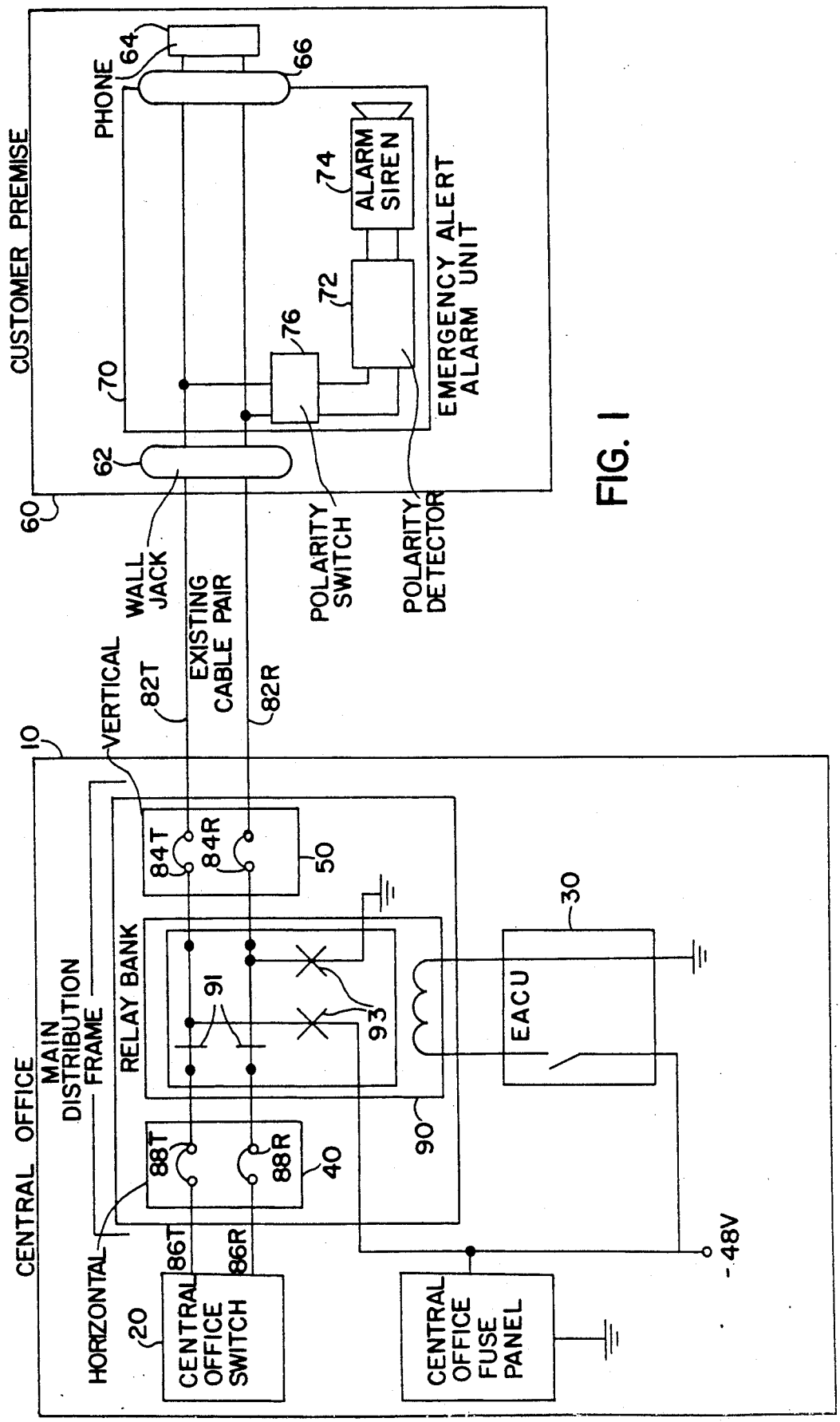
FIG. 1 is a block diagram showing a community alarm system which includes an embodiment of the present invention.

FIG. 1 is a block diagram showing the major components of the present invention. The main distribution frame (MDF) 80 in a central office 10 couples lines in the central switching system to subscriber lines. In a conventional MDF, electrical conduction paths are interposed between a bank 40 of horizontal contacts and a bank 50 of vertical contacts. The present invention is embodied in an alarm system in which a bank of relays 90 is inserted between the vertical contact block 50 and the horizontal contact block 40 of the MDF 80, replacing the conventional direct connection. The subscriber Tip-Ring line pairs 82T, 82R are coupled to the vertical contact block and the Tip-Ring pairs 86T, 86R entering the COS are coupled to the horizontal contact block. Absent an alarm condition, the relay bank 90 provides closed paths between each Tip-Ring pair 86T, 86R on the horizontal block and its respective Tip-Ring pair 82T, 82R on the vertical block to complete a call. The relay bank 90 is controlled by a programmable Emergency Alert Control Unit (EACU) System. On the occurrence of an alarm condition, the EACU breaks the connections between the COS 20 and the subscriber Tip-Ring pairs 82T, 82R in the selected zones which are affected by the emergency. The EACU 30 then causes the relay blocks 90 to couple each affected subscriber line pair to a DC signal whose polarity is reversed from its normal operational state.

Each subscriber to the EAS has an Emergency Alert Alarm Unit (EAAU) 70 installed in parallel with the subscriber's telephone 64. The EAAU 70 contains a polarity detector 72 (e.g. a semiconductor diode) which passes the changed polarity signal to activate the emergency alert. Thus, in response to the polarity change, an alarm 74 is sounded at the respective subscriber locations 60.

By locating the relay bank 90 in the main distribution frame 80, outside of the COS 20, cost and efficiency benefits are realized. The EAS may be installed at a central office without any modifications to the existing COS 20, eliminating potentially costly software or hardware changes within the COS and minimizing disruption of service during installation. During normal operations, there is no degradation of service to any of the EAS subscribers. During an emergency, telephone communications between the COS and unselected subscriber zones are unaffected, as are communications with subscribers which are routed through other central offices.

In FIG. 1, COS 20, horizontal contact block (HCB) 40 and vertical contact block (VCB) 50 are the previously existing components in the central office 10. Relay bank 90 and Emergency Alert Control Unit 30 are additions which support the EAS. It is understood that there are many Tip-Ring pairs connected to COS 20 and that a single pair 86T, 86R is shown in FIG. 1 for simplicity. Tip conductor 86T and Ring conductor 86R form a conductor pair serving a single subscriber. Tip 86T and Ring 86R begin at the COS and terminate at contacts 88T and 88R, respectively, on the HCB 40. An additional Tip-Ring conductor pair, 82T and 82R services the same subscriber and connects telephone 64 to VCB 50 at contact points 84T and 84R. Relay bank 90 is installed between HCB 40 and VCB 50. During normal operations, Relay bank 90 provides conductive paths connecting Tip 86T to Tip 82T and Ring 86R to Ring 82R through closed relay contacts. Tip 86T and Ring 86R are normally maintained at ground and $-48$ Volt potentials, respectively, by COS 20. During an emergency alert, relay bank 90 breaks the contacts between the affected subscribers and the COS, and reverses the polarity of each Tip-Ring pair coupled to the relay bank 90 to signal an alarm condition.

EACU 30 provides the human interface for the originator of an emergency alert. The emergency alert is initiated by dialing into the central office. The originator provides an identification number, a password, and selects the zones to be notified of the emergency. The EACU 30 performs security checks upon incoming emergency alert requests, receives and verifies the affected zones and provides signals which activate the appropriate relay blocks to sound alarms in affected homes. The EACU is described in detail below in reference to FIGS. 2–4.

Emergency Alert Alarm Unit (EAAU) 70 plugs into the existing modular phone jack 62 at a subscriber's home and provides a modular jack 66 for connecting a telephone 64 to the line. The EAAU may be easily installed by the subscriber. EAAU 70 contains a polarity detector 72 (e.g. a semiconductor diode) and an alarm (e.g. a buzzer) 74 which are connected in parallel with the telephone 64. During normal operations, service to the subscriber is not affected by the presence of the EAAU. During an emergency alert, detector 72 causes the alarm 74 to sound in response to a polarity reversal on the line 82T, 82R.

Because activation of the emergency alert system causes relay bank 90 to break the path between the subscriber home 60 and the COS 20, calls in progress on lines which are routed through relay bank 90 are interrupted and both incoming and outgoing calls for these lines are inhibited during the emergency alert. Lines not connected to the EAS and lines connected to relay banks which are not in zones to be alerted are not affected by the alarm condition. Both incoming and outgoing calls may proceed normally on these unaffected lines.

The alarm 74 sounds as long as the line polarity is reversed. In the present embodiment of the present invention, the alarm sounds for 30 seconds every 5 minutes for a one hour period after receipt of the alarm request. This sequencing allows subscribers to use the telephone to make necessary calls in the interval between alarm bursts. It is understood by one skilled in the art that alternative alarm intervals may also be used.

EAAU 70 may include an optional test/polarity switch 76. By manually actuating this switch 76, the subscriber may reverse the polarity of the signal which is applied to the polarity detector 72. Switch 76 allows simple EAAU 70 installation by subscribers regardless of their normal line polarity. A subscriber plugs the EAAU 70 into an existing modular jack and then places switch 76 in the position which does not produce a constant alarm. To test the integrity of EAAU 70 at any time, the subscriber may reverse the position of switch 76. In the absence of an EAAU 70 failure, the alarm will sound until the switch is returned to its normal position.

Figure 2:
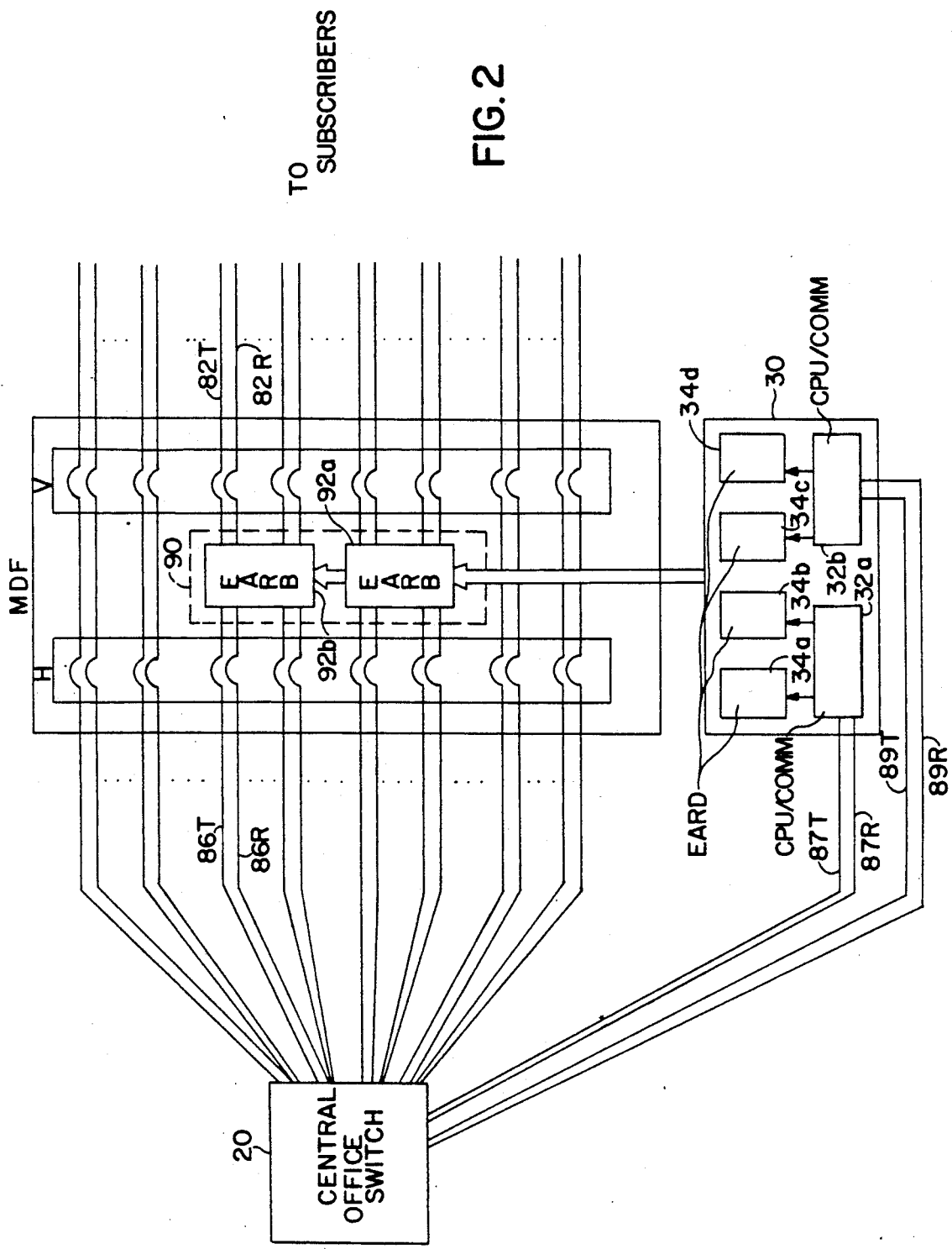
FIG. 2 is a block diagram showing details of the alarm system shown in FIG. 1.

FIG. 2 is a block diagram showing the components of the MDF 80, relay bank 90 and the EACU 30. Relay bank 90 comprises up to 70 Emergency Alert Relay Blocks (EARBs) e.g. 92a and 92b. Each EARB 92 is wired in series with the cross-connect between the HCB 40 and the VCB 50. Each EARB 92 services a maximum of 60 emergency alert subscribers or Tip-Ring pairs e.g. 82T, 82R. Each Tip-Ring pair 82T, 82R is wired through a pair of normally closed relay contacts (as shown in FIG. 1) and is connected to the COS 20 by the central office side line pair 86T, 86R. The central office side of the pair 86T, 86R provides −48 Volts for the Ring lead and ground for the Tip lead. A pair of normally open relay contacts in each EARB 92 connect the Tip line to −48 Volts and the Ring line to ground.

The EACU 30 is a completely redundant controller comprising two CPU/communications modules 32a, 32b and two redundant pairs of relay driver modules (EARD's) 34a-34d. The CPU/communications modules 32a and 32b receive incoming calls from emergency alert originators via the Tip-Ring pairs 87T, 87R and 89T, 89R, respectively. The modules 32a and 32b, command the EARD modules 34a-34d to activate alarms during emergencies, and monitor system integrity during both normal operation and emergency alerts. In addition, the CPU/communications modules 32a and 32b verify the integrity and accuracy of incoming calls which activate the emergency alter system.

The EARD modules 34a and 34b are the primary relay driver modules and the EARD modules 34c and 34d are backup modules. Each driver may be conditioned to operate the relays associated with each specific EARB 92 which the appropriate CPU/communications module 34 determines is to be activated. In the exemplary implementation of the invention, each EARD 34a-34d can handle 70 EARB units 92. With 60 subscriber lines per EARB 92, each driver module 34a-34d is thus capable of operating 4200 subscriber lines. When an emergency alert occurs, EACU 30 activates the EARBs 92 which service the subscribers in the zones to be notified of the emergency. When an EARB 92a-92b is activated, all 60 subscriber lines serviced by the EARB are simultaneously opened by the release of the normally closed relay contacts 91, shown in FIG. 1. A the same time, normally open relay contacts 93, also shown in FIG. 1, are all simultaneously closed, causing a polarity reversal on each line. The polarity reversal activates the subscriber EAAUs 70, as described above.

Figure 3A:
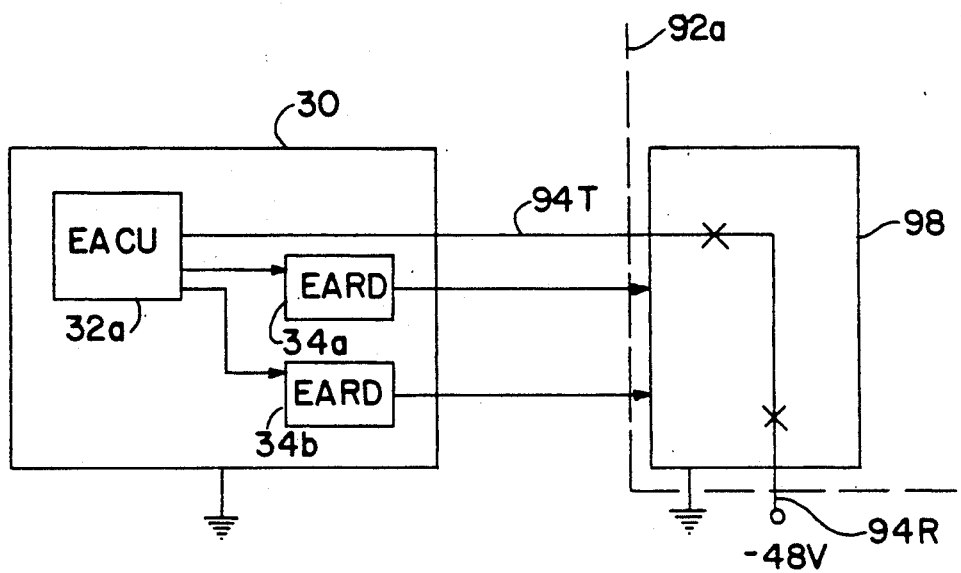
FIG. 3a is a diagram of a specialized Tip-Ring pair for monitoring the status of the alarm system shown in FIG. 1.
Figure 3B:
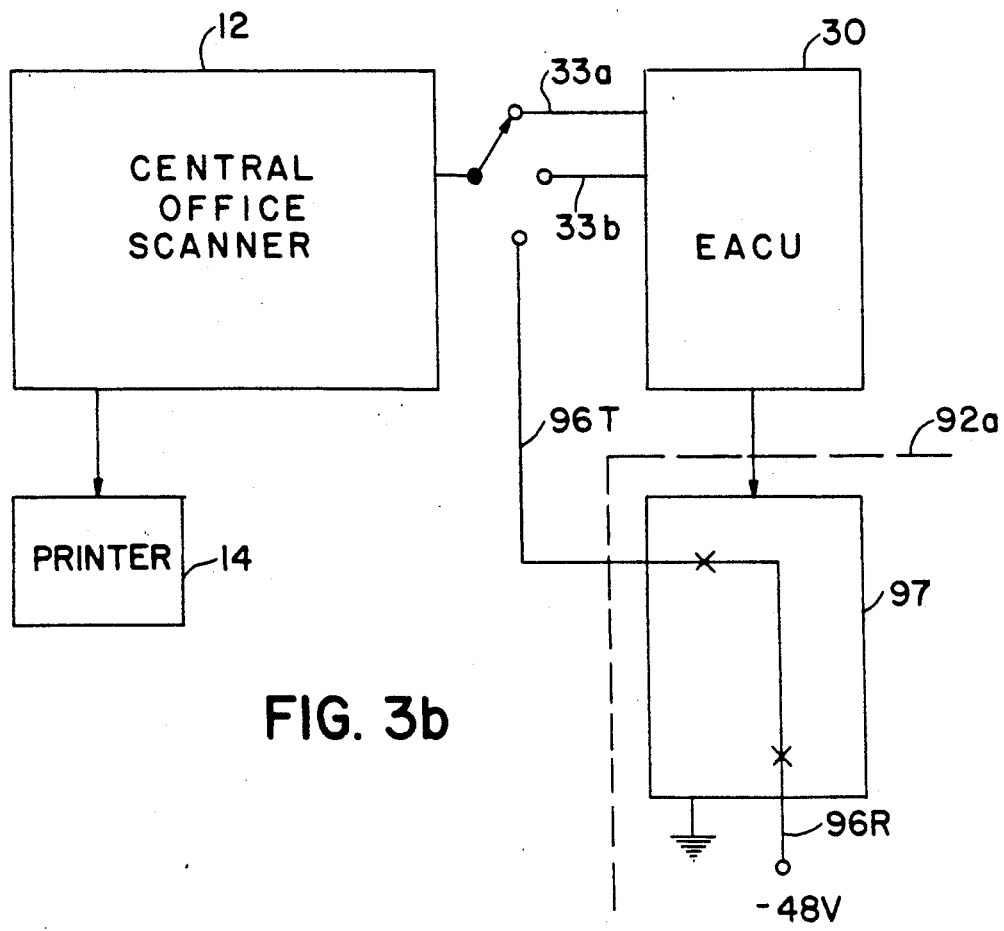
FIG. 3b is a diagram of a specialized Tip-Ring pair which accommodates a scanning device to record the status of the alarm system shown in FIG. 1.

In addition to the relay contacts for each subscriber line, each EARB 92 provides two specialized pairs of relay contacts for test lines 94T, 94R, and 96T, 96R, as shown in respective FIGS. 3a and 3b. The first test line 94T, 94R in FIG. 3a provides feedback to the EACU 30 by indicating if the EARB has been activated. In normal operation, the line 94R is coupled to receive a −48 volt DC signal, and there is no connection between 94R and 94T. During an emergency alert, the activation of the relay block 90 closes a relay 98 to establish a connection between 94R and 94T. The EACU 30 monitors 94T. If a −48 volt potential is not detected on line 94T, then the relay block 90 may not have been activated. In an attempt to correct this condition, the EACU 30 switches from relay drivers 34a, 34b to the redundant relay drivers 34c, 34d.

The central office includes a scanner circuit 302, shown in FIG. 3b, which routinely monitors numerous scan points during normal operations. This scanner steps between the scan points, monitoring each point for the indication of an alarm condition. Each test point is specified to the scanner as having a normal potential value and an abnormal potential value. An alarm condition is indicated if the scanner detects the abnormal potential at the test point. If an alarm condition is detected, a message is printed out indicating the condition so that repairs may be initiated. This scanner circuit provides additional assurance of system integrity without the added expense and complexity of monitoring every line.

In the present embodiment of the invention, this scanner is used to monitor two test points, 33a and 33b in the EACU 30 and a test point 96T on each EARB 92. An alarm condition is indicated at the test point 33a when a verified request to activate the alarm system is received by the EACU. An alarm condition is indicated at the test point 33b if any one of the EARB's 92 is not activated in response to this verified request.

The test point 96T is configured as follows. In normal operation, the line 96R is connected to −48 volts and is not connected to the test point 96T. During an alarm condition, these lines are connected placing −48 volts on the test point 96T. The scanner interprets this potential as an alarm condition and prints out a message. If a relay block 92 is erroneously activated when there is no emergency, or if it does not respond to an activation command during an emergency, the printout provided by the scanner will indicate an error. If such an error is detected, the redundant relay drivers 34c and 34d may replace relay drivers 34a and 34b, the redundant CPU/communications module 32b may be manually or automatically switched to replace the module 32a, or maintenance procedures may be initiated.

In the exemplary embodiment of the invention, each EARB 92 is an AT&T 89E1A type distribution block enclosure or the equivalent to which relay boards are added to provide the Tip-Ring access described above. The relay boards do not alter the physical size of the distribution block enclosure to facilitate installation and maintenance.

An Emergency Alert System in accordance with the exemplary embodiment of the present invention supports configurations including from one to five zones. If the system is configured for a single zone, one EACU will support up to 8,400 Metallic Facility subscribers or 14,800 DLC subscribers in that zone. If the system is configured for more than one zone, each zone is assigned a maximum number of subscribers which is equal to an even multiple of 840.

Figure 4:
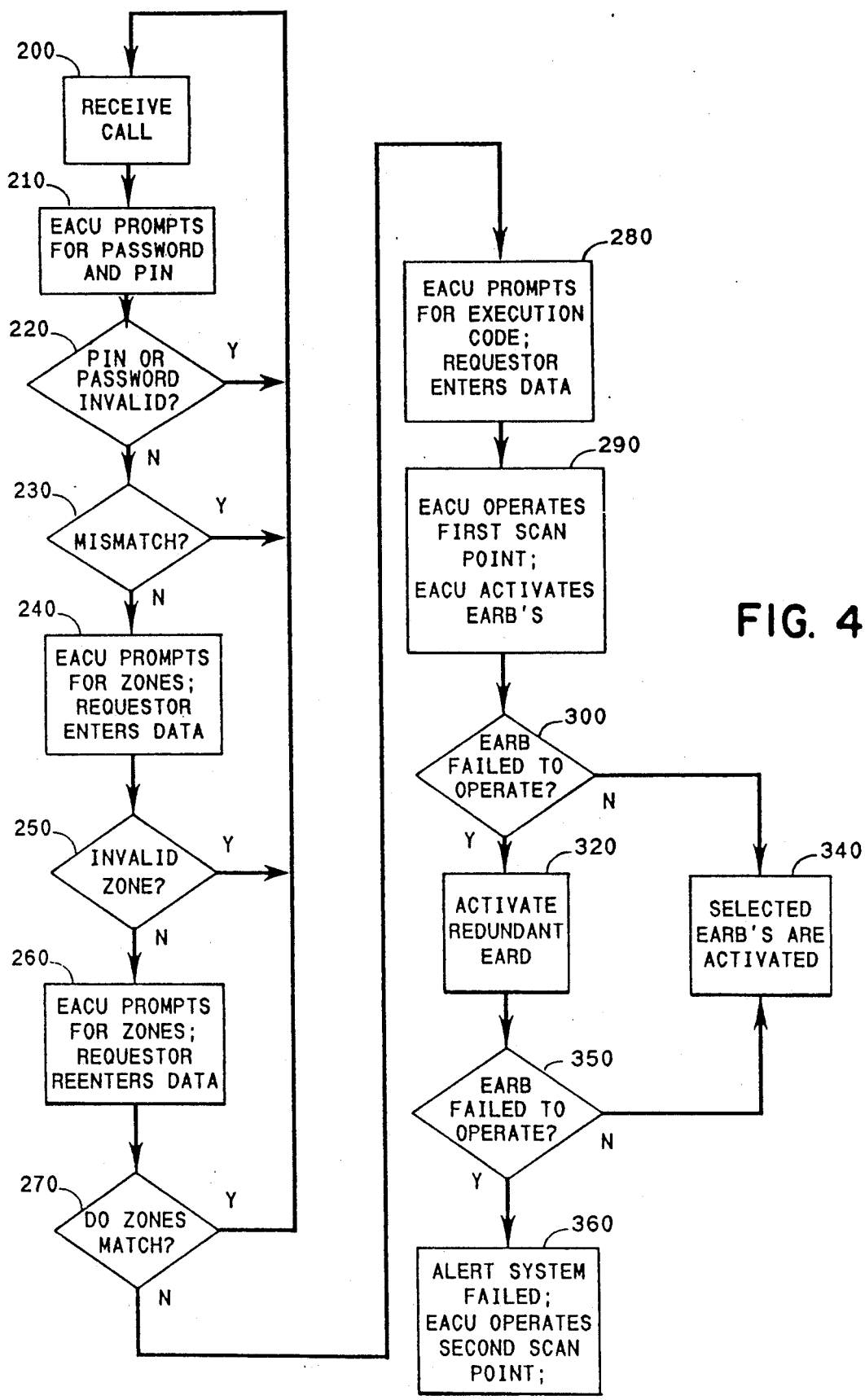
FIG. 4 is a flow chart diagram showing an exemplary method of processing an emergency alert request using the Emergency Alert System shown in FIG. 1.

FIG. 4 is a flow chart showing an exemplary method of processing an emergency alert request using the Emergency Alert System. At step 200, EACU 30 receives a call requesting an emergency alert. The alert may be requested by dialing one of two preassigned telephone numbers which are known only by the authorized emergency preparedness officials. At step 210, EACU 30 prompts the requestor for a Personal Identification Number (PIN) and a password which are entered using a push-button telephone keypad. If either the password or the PIN is invalid, the requestor is instructed to hang up and try again at step 220. If the password and PIN are valid but they do not match, the requestor is instructed to hang up and try again at step 230.

Once password and PIN are properly entered, the requestor is prompted, at step 240, for the zones to be alerted of the emergency. If the zones entered at step 240, in response to this prompt are invalid, the requestor is instructed to hang up and try again at step 250. At step 260, the requestor is then requested to re-enter the affected zones. If, at step 270, the reentered zones do not match the originally entered zones, the requestor is instructed to hang up and retry. If the reentered zones match the originally requested zones, the requestor is prompted once more to verify that he wishes to sound the alarm in the selected zones by entering an execution code at step 280.

At step 290, the EACU activates the scan point 33a, shown in FIG. 3b, to cause the scanner to record the fact that the emergency alarm system has been activated. When the scanner detects an alarm condition at the test point 33a, it enters a mode in which an alarm condition from the test point 96T of at least one of the EARB's 92 is expected. If, after a predetermined delay period, none of the test points 96T indicate an alarm condition, a major alarm (e.g. a bell or a siren in the central office) is activated.. At step 290, the EACU also conditions the EARD's 34a and 34b to operate the appropriated EARBs 92 corresponding to the selected zones.

At step 300, the EACU 30 monitors the feedback from test point 94T on each EARB 92 which should have been activated. In the event that the test point 94T for a any EARB indicates that the EARB has not been activated, the EACU 30 switches, at step 320, from relay drivers 34a, 34b to the redundant relay drivers 34c, 34d.

At step 350, the test points 94T for each of the EARB's are again monitored by the EACU 30. If any of these test points indicate that an EARB has not been activated then, at step 360, the EACU operates the scan point 33b, shown in FIG. 3b, to indicate that the system has failed to notify all of the subscribers. In the exemplary embodiment of the invention, the scanner operates a major alarm in response to the activation of the test point 33b.

At step 340, the alarms in the affected zones are activated. In a second embodiment of the present invention, the EARBs 92 may be installed in a remote terminal while the EACU 30 remains in the central office 10. A dedicated channel (not shown) provides connectivity between the EACU 30 and the EARBs 92 over a digital loop carrier. The remotely located EARBs 92a–92b perform the same functions as in the first embodiment of the invention. It is understood by one skilled in the art that modifications to the interface circuitry between EACU 30 and EARBs 92 may be desirable for the second embodiment and power and space constraints at the remote terminal may make packaging modifications desirable.

While the invention has been described in terms of exemplary embodiments, it is contemplated that it may be practiced as outlined above with modifications within the spirit and scope of the appended claims.

The invention claimed is:

1. An alarm system suitable for use in a telecommunications network which includes central means for selectively coupling respective communications signals of a predetermined polarity to a plurality of remote stations, each of said remote stations having an electrical conduction path to said telecommunications network for receiving one of said communications signals, said alarm system comprising:

alarm request means for generating an alarm request signal to notify selected ones of the plurality of remote stations of an alarm condition;

alarm signalling means, coupled to said telecommunications network and responsive to said alarm request signal, for applying an alarm signal to the respective electrical conduction paths of said selected remote stations in place of any of said communications signals, said alarm signal having a polarity which is reversed with respect to the polarity of the communications signals;

alarm indication means, coupled to at least the selected remote stations, and responsive to the alarm signal for indicating the alarm condition and being substantially unresponsive to the communications signals having said predetermined polarity.

2. The alarm system set forth in claim 1 wherein said alarm signal applied by the alarm signalling means does not interfere with electrical transmissions on the electrical conduction paths coupling said telecommunications network to ones of said remote stations to which the alarm signal is not applied.

3. The alarm system set forth in claim 1 wherein said telecommunications network further includes a central switching system for selectively routing the communications signals among said plurality of remote stations and said alarm signalling means is a device external to the central switching system.

4. The alarm system set forth in claim 3 wherein:

said telecommunications network includes a main distribution frame for coupling the remote stations to the central switching system; and said alarm signalling means is a device installed in said main distribution frame.

5. The alarm system set forth in claim 1, wherein:

said alarm request means includes a predetermined plurality of alarm request signal sources which may each be activated by a predetermined plurality of authorized alarm requesters, said system further comprising;

means, coupled to said plurality of alarm request signal sources, for determining whether an alarm request signal is an authorized alarm request signal originating from one of the predetermined plurality of authorized alarm requesters; and said alarm signalling means is substantially unresponsive to unauthorized alarm request signals.

6. The alarm system set forth in claim 1 further comprising;

backup alarm signalling means, coupled to said telecommunications network and responsive to an activation signal and to the alarm request signal, for applying said alarm signal to said selected remote stations in place of any of said communications signals; and means, coupled to said alarm signalling means for detecting a failure in said alarm signalling means, for activating said backup alarm signalling means when a failure is detected in said alarm signalling means.

7. An alarm system suitable for use in a telecommunications network which includes a central switching system that selectively provides respective communications signals of a first polarity to a plurality of remote stations and that is configured with an electrical conduction path linking each remote station to said central switching system, said alarm system comprising:

a plurality of alarm devices coupled, respectively, to said plurality of remote stations;

means, coupled to said telecommunications network, for selectively applying a signal with a second polarity to selected ones of said electrical conduction paths in response to an activation signal, said second polarity being different from said first polarity; and means, coupled to each of the selected ones of said electrical conduction paths, respectively, for activating each of said alarm devices coupled to the selected electrical conduction paths in response to the presence of said signal of second polarity on the electrical conduction paths and disabling said alarms in response to the presence of said signal of first polarity.

* * * * *